(12) United States Patent
Spraley et al.

(10) Patent No.: US 8,302,256 B1
(45) Date of Patent: Nov. 6, 2012

(54) QUICK-CHANGE CASTER

(76) Inventors: Edward L. Spraley, Rainbow City, AL (US); Benitto Geno Pilotti, Pell City, AL (US)

( * ) Notice: Subject to any disclaimer, the term of this patent is extended or adjusted under 35 U.S.C. 154(b) by 0 days.

(21) Appl. No.: 13/066,551

(22) Filed: Apr. 19, 2011

(51) Int. Cl.
*B60B 33/00* (2006.01)
(52) U.S. Cl. .......................................................... 16/30
(58) Field of Classification Search .............. 16/30, 32, 16/33, 42 R, 31 R, 29, 39; 248/188.8, 129, 248/346.11, 352; 280/79.11, 3, 47.34, 47.35, 280/32.6
See application file for complete search history.

(56) References Cited

U.S. PATENT DOCUMENTS

| | | | | |
|---|---|---|---|---|
| 2,359,016 A | * | 9/1944 | Wood | 280/35 |
| 2,800,679 A | | 7/1957 | Schultz, Jr. | |
| 3,667,085 A | * | 6/1972 | Cumella et al. | 16/30 |
| 3,879,798 A | | 4/1975 | Krulwich | |
| 3,935,613 A | * | 2/1976 | Kaneko | 16/30 |
| 4,038,717 A | * | 8/1977 | Greathouse | 16/29 |
| 4,227,281 A | | 10/1980 | Chung et al. | |
| 4,332,052 A | * | 6/1982 | Remington | 16/30 |
| 4,422,212 A | * | 12/1983 | Sheiman et al. | 16/29 |
| 4,589,530 A | * | 5/1986 | Sher | 190/18 A |
| 4,817,237 A | * | 4/1989 | Murphy | 16/29 |
| 4,843,678 A | | 7/1989 | Park | |
| D355,833 S | * | 2/1995 | Seaquist | D8/374 |
| 5,428,866 A | * | 7/1995 | Aschow | 16/30 |
| D364,085 S | * | 11/1995 | Beckman et al. | D8/375 |
| 5,740,584 A | * | 4/1998 | Hodge et al. | 16/30 |
| 2003/0094554 A1 | * | 5/2003 | Bushey | 248/223.41 |
| 2003/0127815 A1 | | 7/2003 | Hall | |
| 2006/0066065 A1 | | 3/2006 | Mason et al. | |

* cited by examiner

*Primary Examiner* — Chuck Y. Mah
(74) *Attorney, Agent, or Firm* — George L Williamson

(57) ABSTRACT

Method and apparatus for a quick-change caster system for removing and replacing the casters which are used to support articles such as steel racks, containers, crates and the like. The caster system having a housing which is attached to the article so that a caster mounted on a plate can be slidably inserted and removed from the housing in a very quick and easy fashion. Also disclosed is a dampening pad disposed between the caster plate and the housing which is designed to decrease noise, vibration, etc. Also shown is a bolt or the like used for locking the caster plate and dampening plate inside the housing so that it cannot be accidentally removed therefrom.

12 Claims, 2 Drawing Sheets

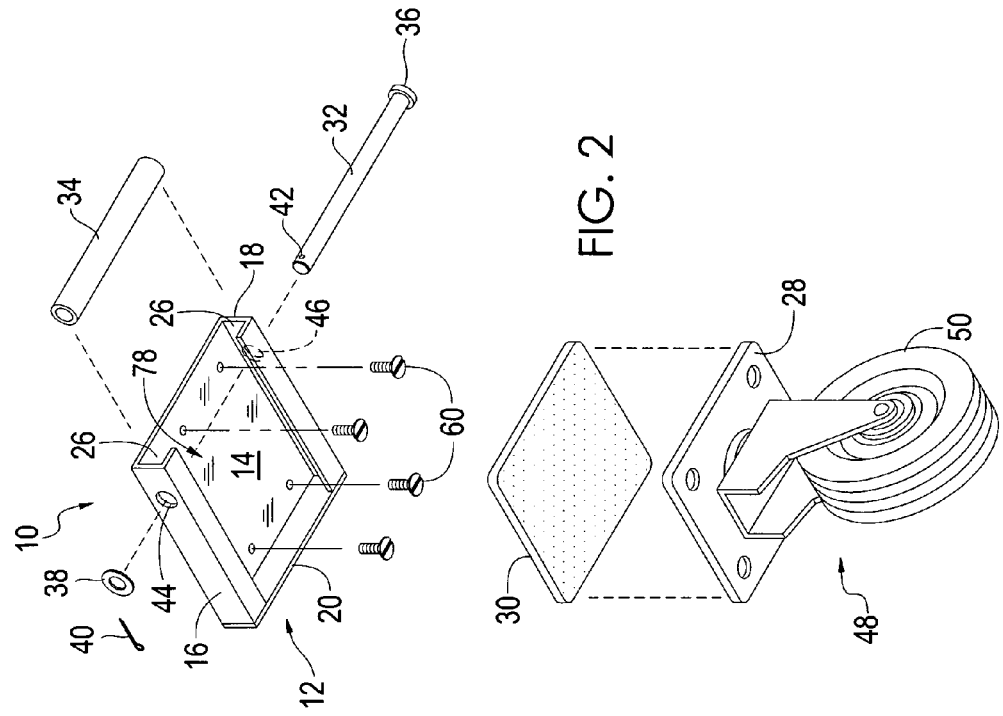
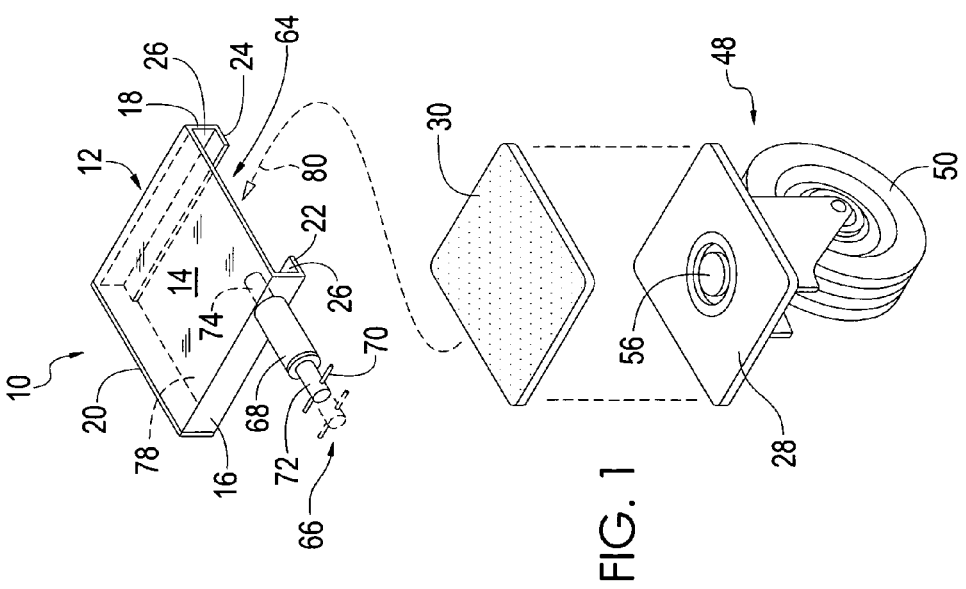

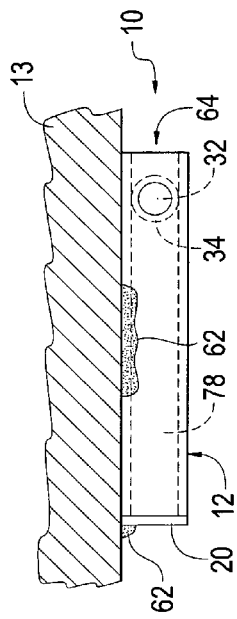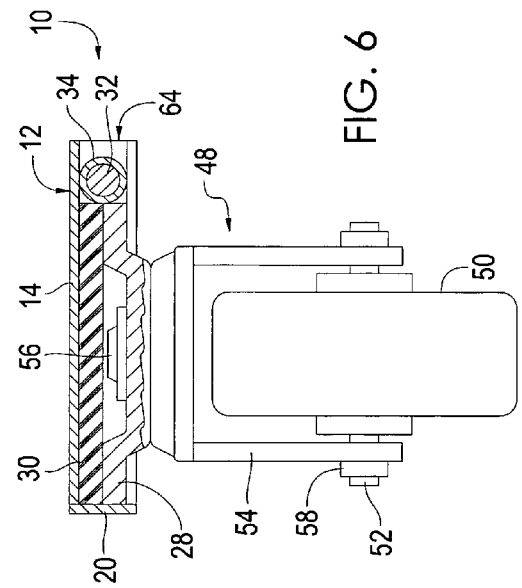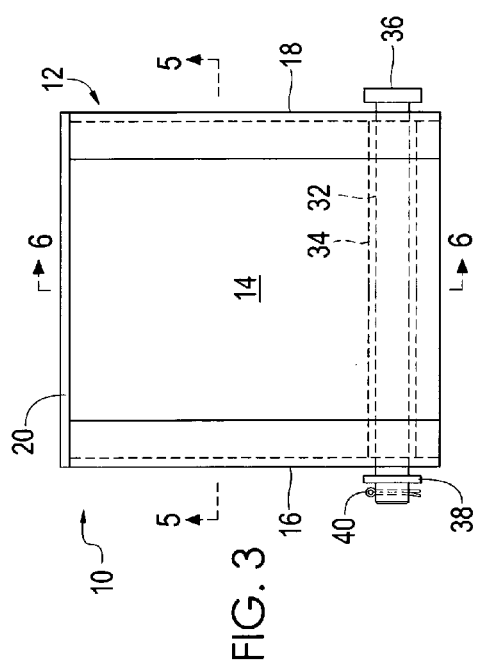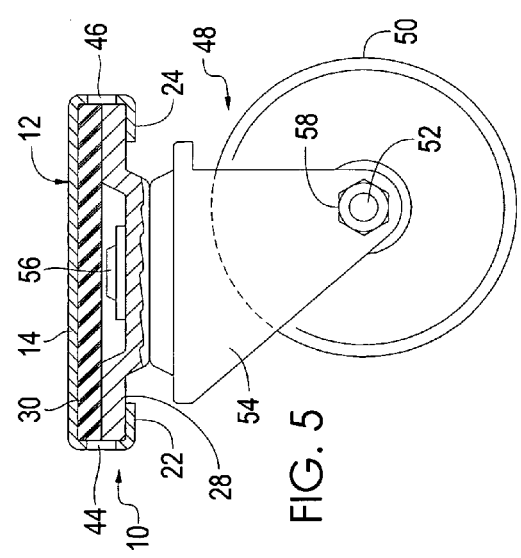

QUICK-CHANGE CASTER

BACKGROUND OF THE INVENTION

1. Field of the Invention

The present invention relates generally to casters and, more particularly, is concerned with a quick-change caster.

2. Description of the Related Art

Removable casters have been described in the related art, however, none of the related art devices disclose the unique features of the present invention.

In U.S. Pat. No. 4,843,678 dated Jul. 4, 1989, Park disclosed a caster pad. In U.S. Patent Application Publication No. 2003/0127815 dated Jul. 10, 2003, Hall disclosed wheeled vehicles, racks, casters for vehicles, etc. In U.S. Patent Application Publication No. 2006/0066065 dated Mar. 30, 2006, Mason, et al., disclosed a removable caster system. In U.S. Pat. No. 4,227,281 dated Oct. 14, 1980, Chung, et al., disclosed a caster pad. In U.S. Pat. No. 2,800,679 dated Jul. 30, 1957, Schultz, Jr., disclosed a caster mounting with removable casters. In U.S. Pat. No. 3,879,798 dated Apr. 29, 1975, Krulwich disclosed a roller for luggage and other objects. In U.S. Patent Application Publication No. 2003/0094554 dated May 22, 2003, Bushey disclosed a caster mounting bracket.

While these removable casters may be suitable for the purposes for which they were designed, they would not be as suitable for the purposes of the present invention as hereinafter described.

SUMMARY OF THE PRESENT INVENTION

The present invention discloses a quick-change caster system for removing and replacing the casters which are used to support articles such as steel racks, containers, crates and the like. The present invention discloses a caster system having a housing which is attached to the article so that a caster mounted on a plate can be slidably inserted and removed from the housing in a very quick and easy fashion. Also disclosed is a dampening pad disposed between the caster plate and the housing which is designed to decrease noise, vibration, etc. Also shown is a bolt or the like used for locking the caster plate and dampening plate inside the housing so that it cannot be accidentally removed therefrom.

An object of the present invention is to provide a system to make replacement of a caster quick and easy. A further object of the present invention is to provide a quick-change caster system wherein the casters are slidably inserted into or removed from a housing. A further object of the present invention is to provide a quick-change system so that the manufacturing time of the articles supported on the casters can be reduced and the articles more easily manufactured. A further object of the present invention is to provide a quick-change caster system which can be easily used by an operator. A further object of the present invention is to provide a quick-change caster system which can be relatively easily, quickly and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is an exploded view of a first preferred embodiment of the present invention as seen from above.

FIG. 2 is an exploded view of a second preferred embodiment of the present invention as seen from below.

FIG. 3 is a plan view of portions of the present invention.

FIG. 4 is an elevation view of portions of the present invention.

FIG. 5 is a cross sectional view of the present invention taken from FIG. 3 as indicated.

FIG. 6 is a cross sectional view of the present invention taken from FIG. 3 as indicated.

LIST OF REFERENCE NUMERALS

With regard to reference numerals used, the following numbering is used throughout the drawings.

| | |
|---|---|
| 10 | present invention |
| 12 | housing |
| 13 | article |
| 14 | base portion |
| 16 | first side portion |
| 18 | second side portion |
| 20 | rear wall portion |
| 22 | first flange |
| 24 | second flange |
| 26 | U-channels |
| 28 | caster plate |
| 30 | dampening pad |
| 32 | bolt |
| 34 | sleeve |
| 36 | head |
| 38 | washer |
| 40 | cotter pin |
| 42 | aperture |
| 44 | aperture |
| 46 | aperture |
| 48 | caster assembly |
| 50 | wheel |
| 52 | axle |
| 54 | yoke |
| 56 | king pin |
| 58 | nut |
| 60 | fastener |
| 62 | weld |
| 64 | opening into housing |
| 66 | spring-loaded pin assembly |
| 68 | housing |
| 70 | handle |
| 72 | pin |
| 74 | tip |
| 78 | inner space of housing |
| 80 | arrow |

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 6 illustrate the present invention wherein a quick-change caster system is disclosed.

Turning to FIGS. 1-6, therein is shown the present invention 10 having a housing 12 having a portion thereof which forms a base portion 14 thereon for supporting an article 13 and downwardly disposed first and second opposite side portions 16, 18 and a downwardly disposed rear side or wall portion 20 wherein the downwardly disposed side portions 16, 18 have an inwardly disposed flange thereon 22, 24 so that base portion 14, side portions 16, 18, rear wall portion 20 and the flanges 22, 24 form oppositely disposed U-shaped channels 26 which channels receive the caster plate 28 and dampening pad 30 therein wherein the caster plate and dampening pad are slidably insertable into and removable from the channels 26 and wherein the caster plate 28 and dampener 30 are secured within the channel after insertion by a blocking means being a first member which may be, for example, in the form of a bolt 32 or the like having a sleeve 34 thereon so that the bolt 32 passes transversely across the opening 64 into the channels 26 of housing 12 so as to block or retain the caster plate 28 and dampening pad 30 inside the housing thereby preventing accidental discharge therefrom. Dampening pad 30 and caster plate 28 slide through opening 64 into the housing 12 as indicated by arrow 80 (see FIG. 1). The bolt 32 has a head 36 thereon on one end and a washer 38 along with a cotter pin 40 which is removably insertable through an aperture 42 on another end of the bolt so that the bolt can be installed through left and right apertures 44, 46 so as to lock the caster plate 28 and dampening pad 30 in the housing 12. Also shown is an exemplary caster assembly being generally designated as 48 comprising a wheel 50 which rotates on an axle 52 attached to a yoke 54 which yoke is attached to the caster plate 28 by a king pin 56 so that the wheel can roll on the axle and the yoke can rotate 360 degrees about the caster plate 28 in the conventional manner. Note that the present invention 10 is usable with both a fixed caster and a rotatable or swivel caster. Also shown is a nut 58 attached to axle 52 which may be used to secure the axle to the yoke 54. The housing 12 may be attached to an article 13 by a plurality of fasteners 60 which could be screws, rivets or the like or the caster plate 28 may be welded as shown at 62 to the article 13 if the article is made of metallic material. Other suitable methods may be used to attach housing 12 to article 13. The sleeve 34 is placed across the opening 64 of housing 12 in order to prevent the downwardly extending side portions 16, 18 from being pushed inwardly by, for example, bumping into a proximate object and thereby frictionally freezing the caster plate 28 and dampener 30 internal the housing 12. Also shown is an alternative exemplary locking means being a second member in the form of a spring-loaded pin assembly generally shown at 66 comprising a housing 68 and at least one handle 70 on a locking pin 72 or the like which is spring-loaded so that the locking pin has an inwardly disposed tip 74 which can slide into and away from one of the U-shaped channels 26 so as to be disposed across one of the U-shaped channels to lock and retain the caster plate 28 and dampener 30 inside the housing 12. The pin 72 moves in response to a user grasping the handle 70 and moving it toward and away from the channel 26. Also generally shown is an opening 64 into the housing which is formed by the base portion 14, side portions 16, 18 and flanges 22, 24 and the inside or inner space of the housing 12 generally shown at 78. The present invention is expected to be constructed of metal, however, the dampening pad 30 may be made of rubber, plastic, leather, or other sound and/or vibration reducing material.

We claim:

1. A caster for attachment to an article, comprising:
   a) a housing, a base portion on said housing, first and second U-channels formed on opposite sides of said base portion, a rear wall portion on said base portion, said housing having an opening therein;
   b) a caster plate, wherein said caster plate is slidable sideways into and out of said U-channels;
   c) a caster assembly disposed on said caster plate to permit the article to be rolled about; and,
   d) a quick release system for locking said caster plate to said housing and permitting said caster plate with caster assembly attached to be removed sideways from said housing in a very quick and easy fashion comprising means slidably penetrating at least one of said U-channels for preventing sideways movement of said caster plate out from said U-channels.

2. The caster of claim 1, wherein said penetrating means comprises a member extending from and through said first U-channel to and through said second U-channel.

3. The caster of claim 1, wherein said penetrating means comprises a member disposed across and through only one of said first and second U-channels.

4. The caster of claim 1, wherein said housing is adapted to be attached to the article by a plurality of fasteners.

5. The caster of claim 1, wherein said housing is adapted to be attached to the article by welding.

6. A method of making a caster for attachment to an article, comprising the steps of:
   a) providing a housing having a base portion thereon having first and second U-channels formed on opposite sides of the base portion, providing a rear wall portion on the base portion, the housing having an opening therein;
   b) providing a caster plate, wherein the caster plate can slide sideways into and out of the U-channels;
   c) providing a caster assembly on the caster plate to permit the article to be rolled about; and,
   d) locking the caster plate to the housing a quick release system to permit said caster plate with caster assembly attached to be removed from said housing in a very quick and easy fashion comprising means slidably penetrating at least one of said U-channels for preventing sideways movement of said caster plate out from said U-channels.

7. The method of claim 6, in which said penetrating means comprises a member extending from and through the first U-channel to and through the second U-channel to lock the caster plate in the housing.

8. The method of claim 6, in which said penetrating means comprises a member disposed in and through only one of the first and second U-channels to lock the caster plate in the housing.

9. The method of claim 6, wherein the housing is attached to the article by a plurality of fasteners.

10. The method of claim 6, wherein the housing is attached to the article by welding.

11. A caster for attachment to an article, comprising:
   a) a housing, a base portion on said housing, first and second U-channels formed on opposite sides of said base portion, a rear wall portion on said base portion, said housing having an opening therein;
   b) a caster plate, wherein said caster plate is slidable into and out of said U-channels;
   c) a caster assembly disposed on said caster plate to permit the article to be rolled about;

d) means for locking said caster plate to said housing whereby the caster plate is retained in the housing; and e) a dampening pad, wherein said dampening pad can slide into and out of said U-channels, wherein said dampening pad is disposed between said caster plates and said base portion of said housing to reduce noise, wherein said dampening pad is retained in the housing by said means for locking.

12. A method of making a caster for attachment to an article, comprising the steps of:

a) providing a housing having a base portion thereon having first and second U-channels formed on opposite sides of the base portion, providing a rear wall portion on the base portion, the housing having an opening therein;

b) providing a caster plate, wherein the caster plate can slide into and out of the U-channels;

c) providing a caster assembly on the caster plate to permit the article to be rolled about;

d) locking the caster plate to the housing; and e) providing a dampening pad, wherein the dampening pad can slide into and out of the U-channels, wherein the dampening pad is disposed between the caster plate and the base portion of the housing to reduce noise, and, locking the dampening pad in the housing.

\* \* \* \* \*